US012445300B2

(12) United States Patent
Ben-Ari

(10) Patent No.: US 12,445,300 B2
(45) Date of Patent: Oct. 14, 2025

(54) SYSTEM AND METHOD FOR PROVIDING A VERIFIED PRIVACY-PRESERVING ATTESTATION OF WEB SERVICE DATA PROPERTIES

(71) Applicant: APPLIED BLOCKCHAIN LTD., London (GB)

(72) Inventor: Adi Ben-Ari, London (GB)

(73) Assignee: APPLIED BLOCKCHAIN LTD., London (GB)

( * ) Notice: Subject to any disclaimer, the term of this patent is extended or adjusted under 35 U.S.C. 154(b) by 450 days.

(21) Appl. No.: 18/017,895

(22) PCT Filed: Aug. 1, 2021

(86) PCT No.: PCT/IL2021/050928
§ 371 (c)(1),
(2) Date: Jan. 25, 2023

(87) PCT Pub. No.: WO2022/029762
PCT Pub. Date: Feb. 10, 2022

(65) Prior Publication Data
US 2023/0269093 A1    Aug. 24, 2023

Related U.S. Application Data

(60) Provisional application No. 63/060,077, filed on Aug. 2, 2020.

(51) Int. Cl.
*H04L 9/32* (2006.01)
*G06F 21/62* (2013.01)
*H04L 9/14* (2006.01)

(52) U.S. Cl.
CPC ........ *H04L 9/3247* (2013.01); *G06F 21/6245* (2013.01); *H04L 9/14* (2013.01)

(58) Field of Classification Search
None
See application file for complete search history.

(56) References Cited

U.S. PATENT DOCUMENTS 9,800,559 B2  10/2017  Roth et al.
10,176,344 B2  1/2019  Smith et al.
(Continued)

FOREIGN PATENT DOCUMENTS

JP  2002358415 A  12/2002
RU  2715796 C1  3/2020
WO  2019168557 A1  9/2019

OTHER PUBLICATIONS

Chen, J., Yao, S., Yuan, Q., He, K., Ji, S. and Du, R., Apr. 2018. Certchain: Public and efficient certificate audit based on blockchain for tls connections. In IEEE INFOCOM 2018-IEEE conference on computer communications (pp. 2060-2068). IEEE. (Year: 2018).*
(Continued)

*Primary Examiner* — Luu T Pham
*Assistant Examiner* — Edward X Long
(74) *Attorney, Agent, or Firm* — The Roy Gross Law Firm, LLC; Roy D. Gross

(57) ABSTRACT

A system and method for providing verified privacy-preserving attestations of requisite properties of private data stored on a web server is disclosed. An untrusted host mediates secure communication for a secure enclave with a data owner device and the web server. A secure enclave verification server provides an attestation to the data owner device that the secure enclave module is secure and has a valid trusted computing base (TCB). The data owner module provides credentials to access the private data to the secure enclave, which retrieves the data and calculates the requisite properties. The secure enclave produces an attestation envelope, which is verified by an attestation envelope verification module. Combining the certificates and keys generated (Continued)

during a TLS handshake between the secure enclave and the web server enables a proof that the data coming into the enclave was from a standard (unmodified) web server API provided by the web server.

22 Claims, 8 Drawing Sheets

(56) References Cited

U.S. PATENT DOCUMENTS

| | | | |
|---|---|---|---|
| 2018/0241572 A1 | 8/2018 | Miele et al. | |
| 2019/0228469 A1 | 7/2019 | Yu et al. | |
| 2020/0184467 A1* | 6/2020 | Segaran | G06Q 20/3674 |
| 2020/0387893 A1* | 12/2020 | Maim | G09C 1/00 |
| 2021/0081935 A1* | 3/2021 | Faulkner | G06Q 20/3674 |

OTHER PUBLICATIONS

Garba, A., Chen, Z., Guan, Z. and Srivastava, G., 2021. LightLedger: A novel blockchain-based domain certificate authentication and validation scheme. IEEE Transactions on Network Science and Engineering, 8(2), pp. 1698-1710. (Year: 2021).*
PCT International Search Report for International Application No. PCT/IL2021/050928, mailed Oct. 14, 2021, 3pp.
PCT Written Opinion for International Application No. PCT/IL2021/050928, mailed Oct. 14, 2021, 5pp.
PCT International Preliminary Report on Patentability for International Application No. PCT/IL2021/050928, issued Feb. 7, 2023, 6pp.
Zhang, F. et al. (2016). Town Crier: An Authenticated Data Feed for Smart Contracts. CCS '16: Proceedings of the 2016 ACM SIGSAC Conference on Computer and Communications SecurityOct. 2016pp. 270-282https://doi. org/10.1145/2976749.2978326.
Knauth, T. et al. (2018). Integrating Remote Attestation with Transport Layer Security. arXiv.org, Cornell University. arXiv:1801.05863. https://doi.org/10.48550/arXiv.1801.05863.
European Patent Office, Communication Pursuant to Rules 70(2) and 70a(2) EPC for European Patent Application No. 21852245.6, dated Jan. 23, 2024, 1pp.
European Patent Office, Supplementary European Search Report for European Patent Application No. 21852245.6, dated Jan. 5, 2024, 9pp.

* cited by examiner (CONTINUED FROM PREVIOUS PAGE)

| | |
|---|---|
| SECURE ENCLAVE MODULE CONSTRUCTING AN ATTESTATION ENVELOPE | ~ 260 |

| | |
|---|---|
| UNTRUSTED HOST MODULE RECEIVING THE ATTESTATION ENVELOPE AND ADDING THE SECURE ENCLAVE ATTESTATION PACKET THEREIN | ~ 265 |

| | |
|---|---|
| UNTRUSTED HOST SENDING THE ATTESTATION ENVELOPE TO THE ATTESTATION ENVELOPE VERIFICATION SERVER | ~ 270 |

| | |
|---|---|
| ATTESTATION ENVELOPE VERIFICATION SERVER VERIFYING THE ATTESTATION ENVELOPE | ~ 275 |

FIG. 6 (cont'd)

SYSTEM AND METHOD FOR PROVIDING A VERIFIED PRIVACY-PRESERVING ATTESTATION OF WEB SERVICE DATA PROPERTIES

CROSS REFERENCE TO RELATED APPLICATIONS

This application is a National Phase of PCT Patent Application No. PCT/IL2021/050928 having International filing date of Aug. 1, 2021, which claims the benefit of priority of U.S. Provisional Patent Application No. 63/060,077, filed Aug. 2, 2020, the contents of which are all incorporated herein by reference in their entirety.

FIELD OF THE INVENTION

The invention is in the field of cryptographic data security and privacy, and in particular pertains to providing a verified privacy-preserving attestation of properties of private data stored on a web service.

BACKGROUND TO THE INVENTION

Systems for providing attestation from within a secure computing environment are disclosed in the prior art.

U.S. Pat. No. 9,800,559 B2 discloses techniques for hosting components of provider services within secure execution environments. Information associated with a request received at a control plane of a service is received at a secure execution environment and, based at least in part on that information, one or more tasks is determined that may be performed to respond to the request. A task of the one or more tasks is performed within the secure execution environment to generate a response to the request, the response is encrypted within the secure execution environment using a key stored within the secure execution environment and available to a component of a computer system, and the encrypted response is made available. An agent of the secure execution environment may be configured to decrypt uploaded data and/or applications and may also be configured to validate such uploaded data and/or applications by, for example, providing a certificate or an attestation associated with the validity of the uploaded data and/or applications.

U.S. Pat. No. 10,176,344 B2 discloses an electronic device that can be configured to receive untrusted input data at an enclave in an electronic device, isolate the untrusted input data from at least a portion of the enclave, communicate at least a portion of the untrusted data to an integrity verification module using an attestation channel, and receive data integrity verification of the untrusted input data from the integrity verification module. The integrity verification module can perform data integrity attestation functions to verify the untrusted data and the data integrity attestation functions include a data attestation policy and a whitelist.

The present invention improves the state-of-the-art in providing attestation from within a secure computing environment, as described below.

SUMMARY

In an aspect of the present invention is provided a system and method for proving the origin and properties of sensitive, private data returned by standard HTTPS web services, without requiring modification of the web services or exposing the private data beyond the web service providers.

In an aspect of the invention is provided a system and method whereby individuals and companies may prove properties of sensitive, private data held about them by web service providers, without having to reveal or share the private data. For example, an owner of a bank account can prove to a creditor that the account balance is or remains above a minimum balance required for receiving or maintaining a line of credit, while the account balance itself is not revealed to the creditor.

In some embodiments, the source of the private data is a standard, unmodified HTTPS web service from a web service provider (e.g. bank API).

With presently known technology, it is a challenge to prove that private data has been retrieved from a web service for the following reason: the TLS protocol, used in HTTPS in most web service calls, provides a server certificate proving the identity of the server, but uses a shared symmetric key in order to encrypt message data, and a symmetric MAC signature. It is therefore not possible for a third party to be satisfied that the data in an HTTPS response received by a client really was sent by that HTTPS server, for the client could have created and encrypted it themselves using the symmetric key. TLS thereby does not provide the required artifacts in order to create a valid attestation.

One solution is to modify the web service such that it digitally signs the response that includes the private data. However, this solution is not practically possible in many cases, as the web service is often provided by a third party.

In an aspect of the present invention is provided a system and method for the use of existing TLS artifacts and combining them with artifacts created in a secure enclave in order to create an attestation of the response.

While such attestation can be provided by third-party hosting of the web client, the third party providing the attestation must be given access to the private data in order to generate an attestation, and must be trusted by verifiers in order to provide an independent attestation.

Rather than trusting a third party, in an aspect of the invention is provided a system comprising a secure enclave module to retrieve and process the private data to attest to one or more requisite properties of the private data. Additionally, the secure enclave provider attests to the secure enclave itself, although this attestation does not require the revealing or sharing of the private data to the provider. Additional modules attest that the secure enclave module is in fact secure and has a valid trusted computing base (TCB); and that the properties were in fact computed and that the computation was based on data retrieved from the web service, at a given time stated by the web service.

Therefore, it is an objective of the invention to provide a system for providing a verified privacy-preserving attestation of properties of private data stored on a web service, comprising
  a data owner device;
  a data attestation server comprising an untrusted host and
    a secure enclave module;
  a secure enclave attestation module;
  an attestation envelope verification module;
wherein the system is configured for performing the following steps:
  a. the untrusted host module, configured to mediate communication to and from the secure enclave module, receiving a data attestation request;
  b. the untrusted host module sending a secure enclave attestation packet for the secure enclave module—comprising a secure enclave attestation, a secure enclave attestation signature, and an X.509 secure enclave attestation signing certificate—generated by the secure enclave attestation module, to the data owner device; the secure enclave attestation attesting that the secure enclave module associated with the untrusted host module is secure and has a valid trusted computing base (TCB), the secure enclave attestation further comprising a unique measurement of the TCB code and the public keys belonging to the secure enclave;

c. the data owner device requesting a public key of the secure enclave module;

d. the data owner device verifying that the public key of the secure enclave module is identical to the public key provided in the secure enclave attestation;

e. the data owner device sending credentials for accessing private data stored on a web server to the secure enclave module, encrypted with a secure symmetric key algorithm;

f. the secure enclave module making a request for a TLS-encrypted HTTPS connection to the web server to retrieve the private data;

g. the secure enclave module performing a TLS handshake with the web server, thereby obtaining a TLS service certificate of the web server;

h. the secure enclave module decrypting an HTTPS response from the web server, the HTTPS response encapsulating the private data;

i. the secure enclave module computing one or more requisite properties of the private data;

j. the secure enclave module constructing an attestation envelope, comprising
  i. the web server TLS service certificate;
  ii. the computed requisite properties of the private data;
  iii. the attestation envelope signature of the secure enclave module for the above data.

k. the untrusted host module receiving the attestation envelope and inserting the secure enclave attestation, secure enclave attestation signature, and X.509 secure enclave attestation signing certificate;

l. the untrusted host module sending the attestation envelope to the attestation envelope verification server;

m. the attestation envelope verification server verifying the attestation envelope, comprising steps of
  i. checking that the secure enclave attestation verification report is valid and the report was signed by a private key corresponding to the public key certificate chain (a list of certificates where the parent certificate signs the child certificate) and ultimately signed by the root certificate authority of the hardware manufacturer; and
  ii. checking that the public keys reported in the secure enclave attestation packet matches the secure enclave public keys and contains the unique measurement of the TCB code;
  iii. checking that the web service TLS server certificate chain is valid;
  iv. checking that the computed property is signed by a key that is paired with the secure enclave module; and
  V. checking that the untrusted host module does not have any known security vulnerabilities and the secure enclave is configured correctly.

It is a further objective of the invention to provide the above system, wherein if the public keys of a secure enclave module have not been verified by the secure enclave attestation server, a. the secure enclave module is further configured to generate a secure enclave report comprising
  i. the code measurements of the TCB; and
  ii. public keys of the secure enclave module;
b. the untrusted host module is further configured to receive the secure enclave report and send it with a remote attestation request to the secure enclave attestation module; and
c. the secure enclave attestation module is further configured to generate a new secure enclave attestation, secure enclave verification signature, and secure enclave verification certificate and sending them to the untrusted host module.

It is a further objective of the invention to provide the previous system, further comprising a quoting module configured to sign the secure enclave report.

It is a further objective of the invention to provide any one of the above systems, wherein the public keys belonging to the secure enclave are randomly generated, derived from the unique measurement of the TCB code, or any combination thereof.

It is a further objective of the invention to provide any one of the above systems, wherein the data owner device is further configured to verify the secure enclave verification credentials and encryption public key before encrypting private data with a symmetric key algorithm.

It is a further objective of the invention to provide any one of the above systems, wherein the secure enclave module is further configured to encrypt and save the access credentials for later use.

It is a further objective of the invention to provide any one of the above systems, wherein the secure enclave module is further configured to include non-private data in the attestation envelope.

It is a further objective of the invention to provide the previous system, wherein the non-private data comprises any combination of data identifying the data owner and a data response timestamp.

It is a further objective of the invention to provide any one of the above systems, further comprising a verifier device provided access to the output of the attestation envelope verification server.

It is a further objective of the invention to provide a system for verifying and storing a privacy-preserving attestation, of properties of private data stored on a web server, on a blockchain and associating them with blockchain wallet addresses, the system comprising a data owner device;
a web server;
a data attestation server comprising an untrusted host and a secure enclave module;
a secure enclave attestation server;
an attestation envelope verification module and a secure enclave attestation verification module of a verification smart contract;
a blockchain network a decentralized finance smart contract that may represent a liquidity pool whereby release of funds is dependent upon verification of the attestation envelope which may represent financial risk credentials of an individual, organization or document, such as an invoice, or privacy-preserving proof of KYC/KYB/KYT/AML credentials of decentralized finance investors;

wherein the system is configured to perform steps of
a. the untrusted host module configuring the secure enclave module and generates a report about the configuration and TCB code running in the secure enclave module;

b. the untrusted host module verifying the report with the secure enclave attestation server;
c. the data owner device sending a request for a privacy-preserving attestation of private data to the untrusted host module and receiving a public encryption key for the enclave in reply;
d. the data owner device signing a message with a blockchain wallet private key of a data owner and sending the signed message and blockchain wallet signature along with their web service credentials to the secure enclave;
e. the secure enclave fetching private data and performing privacy-preserving computations on the private data and producing a data attestation envelope comprising the signed message and the blockchain wallet signature in the attestation data envelope with the result of the computation, signing the envelope and returning it to the untrusted host module;
f. the untrusted host module or data owner device uploading the attestation data envelope and secure enclave verification to an attestation envelope verification module of a smart contract verification server;
g. the secure enclave attestation verification module verifying the public keys belong to a secure enclave and the signature of the attestation data envelope is valid and extracting the original blockchain wallet address from the blockchain wallet signature and signed message; and
h. the blockchain smart contract acting upon correct verification of the attestation envelope by sending the result to a blockchain of a decentralized finance smart contract that may represent a liquidity pool whereby release of funds is dependent upon verification of the attestation envelope which may represent financial risk credentials of an individual, organization or document, such as an invoice, or privacy-preserving proof of KYC/KYB/KYT/AML credentials of decentralized finance investors.

It is a further objective of the invention to provide a method for providing a verified privacy-preserving attestation of properties of private data stored on a web service, characterized by steps of
a. obtaining a system for providing a verified privacy-preserving attestation of properties of private data stored on a web service;
b. the untrusted host module, configured to mediate communication to and from the secure enclave module, receiving a data attestation request;
c. the untrusted host module sending a secure enclave attestation packet for the secure enclave module—comprising a secure enclave attestation, a secure enclave attestation signature, and an X.509 secure enclave attestation signing certificate—generated by the secure enclave attestation module, to the data owner device; the secure enclave attestation attesting that the secure enclave module associated with the untrusted host module is secure and has a valid trusted computing base (TCB), the secure enclave attestation further comprising a unique measurement of the TCB code and the public keys belonging to the secure enclave;
d. the data owner device requesting a public key of the secure enclave module;
e. the data owner device verifying that the public key of the secure enclave module is identical to the public key provided in the secure enclave attestation;
f. the data owner device sending credentials for accessing private data stored on a web server to the secure enclave module, encrypted with a secure symmetric key algorithm;
g. the secure enclave module making a request for a TLS-encrypted HTTPS connection to the web server to retrieve the private data;
h. the secure enclave module performing a TLS handshake with the web server, thereby obtaining a TLS service certificate of the web server;
i. the secure enclave module decrypting an HTTPS response from the web server, the HTTPS response encapsulating the private data;
j. the secure enclave module computing one or more requisite properties of the private data;
k. the secure enclave module constructing an attestation envelope, comprising
  i. the web server TLS service certificate;
  ii. the computed requisite properties of the private data;
  iii. the attestation envelope signature of the secure enclave module for the above data.
l. the untrusted host module receiving the attestation envelope and inserting the secure enclave attestation, secure enclave attestation signature, and X.509 secure enclave attestation signing certificate;
m. the untrusted host module sending the attestation envelope to the attestation envelope verification server;
n. the attestation envelope verification server verifying the attestation envelope, comprising steps of
  i. checking that the secure enclave attestation verification report is valid and the report was signed by a private key corresponding to the public key certificate chain (a list of certificates where the parent certificate signs the child certificate) and ultimately signed by the root certificate authority of the hardware manufacturer; and
  ii. checking that the public keys reported in the secure enclave attestation packet matches the secure enclave public keys and contains the unique measurement of the TCB code;
  iii. checking that the web service TLS server certificate chain is valid;
  iv. checking that the computed property is signed by a key that is paired with the secure enclave module; and
  v. checking that the untrusted host module does not have any known security vulnerabilities and the secure enclave is configured correctly.

It is a further objective of the invention to provide the above method, wherein if the public keys of a secure enclave module have not been verified by the secure enclave attestation server, the method further comprises steps of
i. the secure enclave module generating a secure enclave report comprising
  i. the code measurements of the TCB; and
  ii. public keys of the secure enclave module;
j. the untrusted host module receiving the secure enclave report and sending it with a remote attestation request to the secure enclave attestation module; and
k. the secure enclave attestation module generating a new secure enclave attestation, secure enclave verification signature, and secure enclave verification certificate and sending them to the untrusted host module.

It is a further objective of the invention to provide the previous method, further comprising a step of a quoting module signing the secure enclave report.

It is a further objective of the invention to provide any one of the above methods, wherein the public keys belonging to the secure enclave are randomly generated, derived from the unique measurement of the TCB code, or any combination thereof.

It is a further objective of the invention to provide any one of the above methods, further comprising a step of the data owner device verifying the secure enclave verification credentials and encryption public key before encrypting private data with a symmetric key algorithm.

It is a further objective of the invention to provide any one of the above methods, further comprising a step of the secure enclave module encrypting and saving the access credentials for later use.

It is a further objective of the invention to provide any one of the above methods, further comprising a step of the secure enclave module including non-private data in the attestation envelope.

It is a further objective of the invention to provide the previous method, wherein the non-private data comprises any combination of data identifying the data owner and a data response timestamp.

It is a further objective of the invention to provide any one of the above methods, further comprising a step of providing a verifier device access to the output of the attestation envelope verification server.

It is a further objective of the invention to provide a method for verifying and storing a privacy-preserving attestation, of properties of private data stored on a web server, on a blockchain and associating them with blockchain wallet addresses, the method comprising steps of
  a. the untrusted host module configuring the secure enclave module and generates a report about the configuration and TCB code running in the secure enclave module;
  b. the untrusted host module verifying the report with the secure enclave attestation server;
  c. the data owner device sending a request for a privacy-preserving attestation of private data to the untrusted host module and receiving a public encryption key for the enclave in reply;
  d. the data owner device signing a message with a blockchain wallet private key of a data owner and sending the signed message and blockchain wallet signature along with their web service credentials to the secure enclave;
  e. the secure enclave fetching private data and performing privacy-preserving computations on the private data and producing a data attestation envelope comprising the signed message and the blockchain wallet signature in the attestation data envelope with the result of the computation, signing the envelope and returning it to the untrusted host module;
  f. the untrusted host module or data owner device uploading the attestation data envelope and secure enclave verification to an attestation envelope verification module of a smart contract verification server;
  g. the secure enclave attestation verification module verifying the public keys belong to a secure enclave and the signature of the attestation data envelope is valid and extracting the original blockchain wallet address from the blockchain wallet signature and signed message; and
  h. the blockchain smart contract acting upon correct verification of the attestation envelope by sending the result to a blockchain of a decentralized finance smart contract that may represent a liquidity pool whereby release of funds is dependent upon verification of the attestation envelope which may represent financial risk credentials of an individual, organization or document, such as an invoice, or privacy-preserving proof of KYC/KYB/KYT/AML credentials of decentralized finance investors.

DETAILED DESCRIPTION

Definitions

Figure 1:
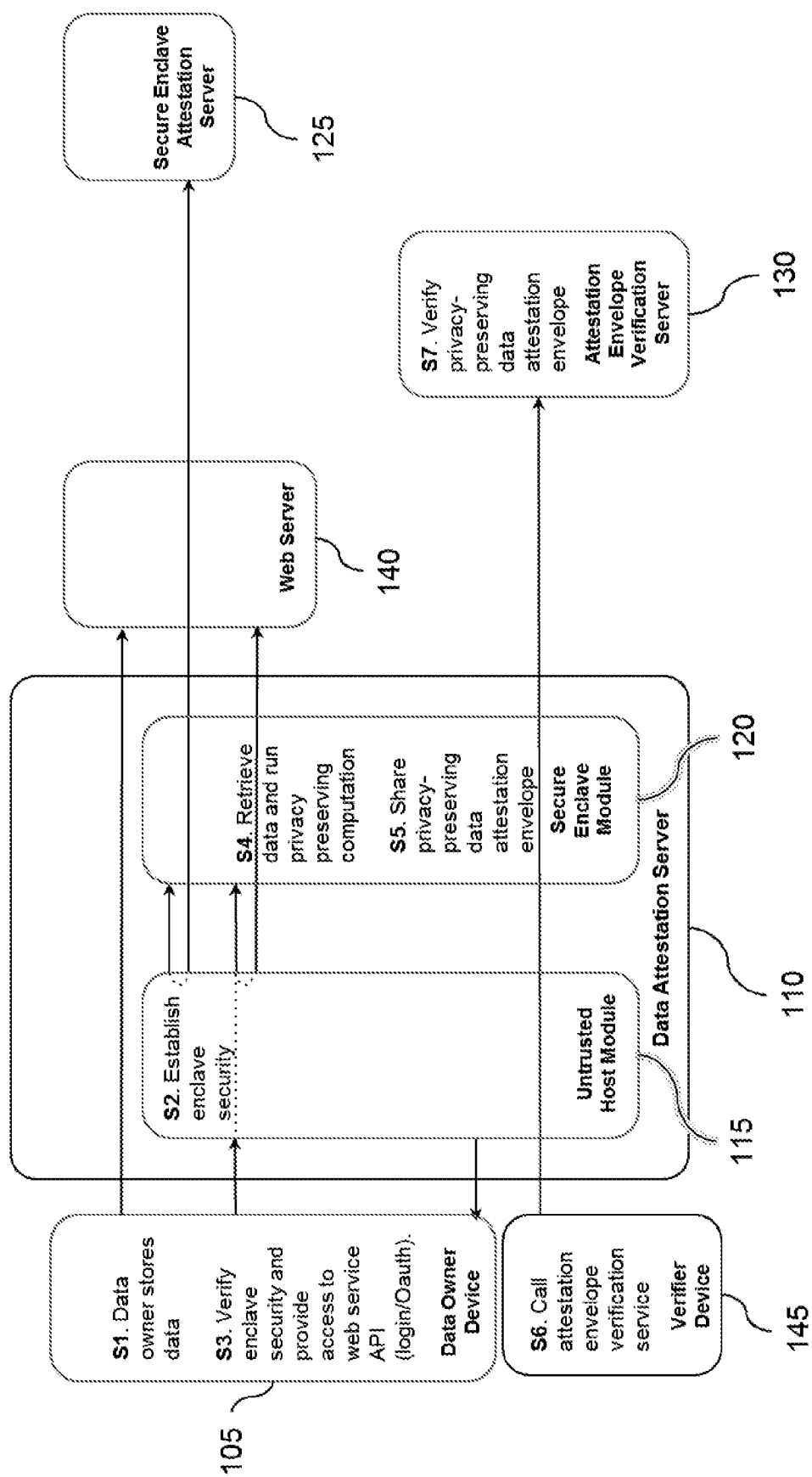
FIGS. 1 and 2 show a high-level and detailed flow diagram, respectively, of a system and method for providing a verified privacy-preserving attestation of properties of private data stored on a web service, according to some embodiments of the invention.

Computing device refers to any device with at least a processor and non-transitory computer-readable medium (CRM), such as read-only memory, RAM memory, flash memory, or a disk drive. In this disclosure, two or more elements defined as computing devices does not preclude the computing devices sharing one or more common processors.

Instructions refers to code stored in CRM, and executable by a processor.

A web server provides web services of a provider (e.g., bank, government, accounting software, ERP server, KYC, KYB, KYT, AML) holding private data of one or more data owners. The web services are provided over a secure internet data transfer protocol such as HTTPS. In preferred embodiments, the web services are standard; no modification to the web server is required for its interoperability with a system of the invention. Typically, a web server comprises an API that services requests from external servers, devices, and modules.

Data owner device refers to a computing device comprising a non-transitory computer-readable medium storing, 1) credentials needed to access private data stored on a web service or instructions authorizing retrieval thereof; 2) instructions for verifying that secure communication with a secure enclave module has been established; and 3) instructions to a processor for securely initiating and verifying, as further described herein, a privacy-preserving data attestation of one or more properties of the private data, such as whether or not the private data meets a one or more requisite criteria. The data owner device may further comprise a user interface configured for entering personal access credentials (e.g., password, fingerprint) and for the data owner to authorize data attestations. Actions of the data owner device described herein may be performed automatically by the data owner device and/or may be done upon the data owner interacting with the user interface of the data owner device.

A data attestation server refers to one or more computing devices of an entity providing data attestation services.

A secure enclave module refers to a computing device of a data attestation server comprising a non-transitory computer-readable medium storing instructions to a processor for securely, 1) receiving a data attestation request and access credentials from a data owner device; 2) fetching a data owner's private data from a web server; and 3) computing one or more properties of the private data (e.g. whether the private data meets a requisite criterion) and providing a data attestation thereto. The signing of the data attestation and other measures to ensure data validity and privacy are further described herein. The secure enclave module contains a set of asymmetric public and private cryptographic keys used for various cryptographic functions. The keys can either be random and unique to a utilization instance of secure enclave module or derived from a unique measurement of the secure enclave module's TCB code. In this context, security refers to the memory of the enclave being inaccessible to the host system regardless of the permission level.

A secure enclave quoting module refers to a computing device of the data attestation server comprising a non-transitory computer-readable medium storing instructions to a processor for signing a report of the secure enclave module with a private key to form a quote.

Instructions and data in the secure enclave and secure enclave quoting modules are enabled, for example, by the Intel Software Guard Extensions (SGX), built-in security code stored in protected memory of a processor.

An untrusted host module refers to a computing device of the data attestation server comprising a non-transitory computer-readable medium storing instructions for mediating communication of the secure enclave and secure quoting enclave modules of the data attestation server with servers and devices external to the data attestation server.

Verifier device refers to a to a computing device comprising a non-transitory computer-readable medium storing instructions to a processor for receiving and verifying, as further described herein, a privacy-preserving attestation that, 1) the web server holds data belonging to the data owner; and 2) the same data has undergone the necessary privacy-preserving computation to determine whether the data meets the criterion, leading to a shared output, without learning anything else about the data.

Each of the servers, modules, and devices described herein may be embodied within a single computing device. Conversely, a functions server, module, or device, as described herein, may be distributed over a plurality of computing devices, interconnected, as needed, via one or more means of communication employing appropriate security measures known in the art. Furthermore, the plurality of computing devices of a module may be delegated to different entities with common authorizations. A server, module, or device may be cloud-based, in whole or in part.

A data attestation is the result of a computation made in a secure enclave module, attesting that private data has one or more specified properties.

A secure enclave attestation server attests that a secure enclave is in fact secure and has a valid trusted computing base (TCB). As a non-limiting example, the secure enclave attestation server may comprise an Intel IAS attestation cloud server.

An attestation envelope verification report attests that the secure enclave module received the private data from the web server, that the data attestation was computed with the TCB programming code specified in the secure enclave attestation, and that the computation was in fact based on the private data.

Reference is now made to FIG. 1, showing a high-level workflow diagram of a system and method for providing verified privacy-preserving attestation of properties of private data stored on a web service, according to some embodiments of the invention.

In step S1, a data owner device 105 (e.g., a personal computer or smartphone) effects storage or modification of data in a web server 140. For example, a bank depositor (the data owner), uses their smartphone to initiate transactions that modify their account balance (the data) on a bank's server (the web server 140).

In S2, upon a third party's request to a data attestation server 110 for an attestation, an untrusted host module 115 of the data attestation server 110 summons a secure enclave verification module 125 to verify the security of a secure enclave module 120 of the data attestation server 110.

In S3, the data owner device 105 requests from the data attestation server 110 verification of the security of the secure enclave module 120. Upon checking the authenticity of the verification, assuring that the secure enclave module 120 is secure, the data owner device 105 provides the data attestation server 110 access credentials (e.g. login and/or OAuth) required to access the data owner's data stored on the web server 140.

In S4, the untrusted host module 115, equipped with the data owner's access credentials, retrieves the data owner's data, on behalf of the data owner, from the web server 140, via the web server API 140A, and summons the secure enclave module 120 to perform a security-preserving attestation. For example, that the depositor's account balance is at least $10,000.

In S5, the secure enclave 120 produces a privacy-preserving data attestation envelope and shares it with the data owner device 105. The attestation envelope includes attestation credentials, as further described herein.

In S6, a verifying device 145 calls an attestation envelope verification server 130.

In S7, the verifying device 145 verifies the privacy-preserving data attestation envelope. The attestation envelope verification is now available to the third party requesting the attestation.

Figure 2:
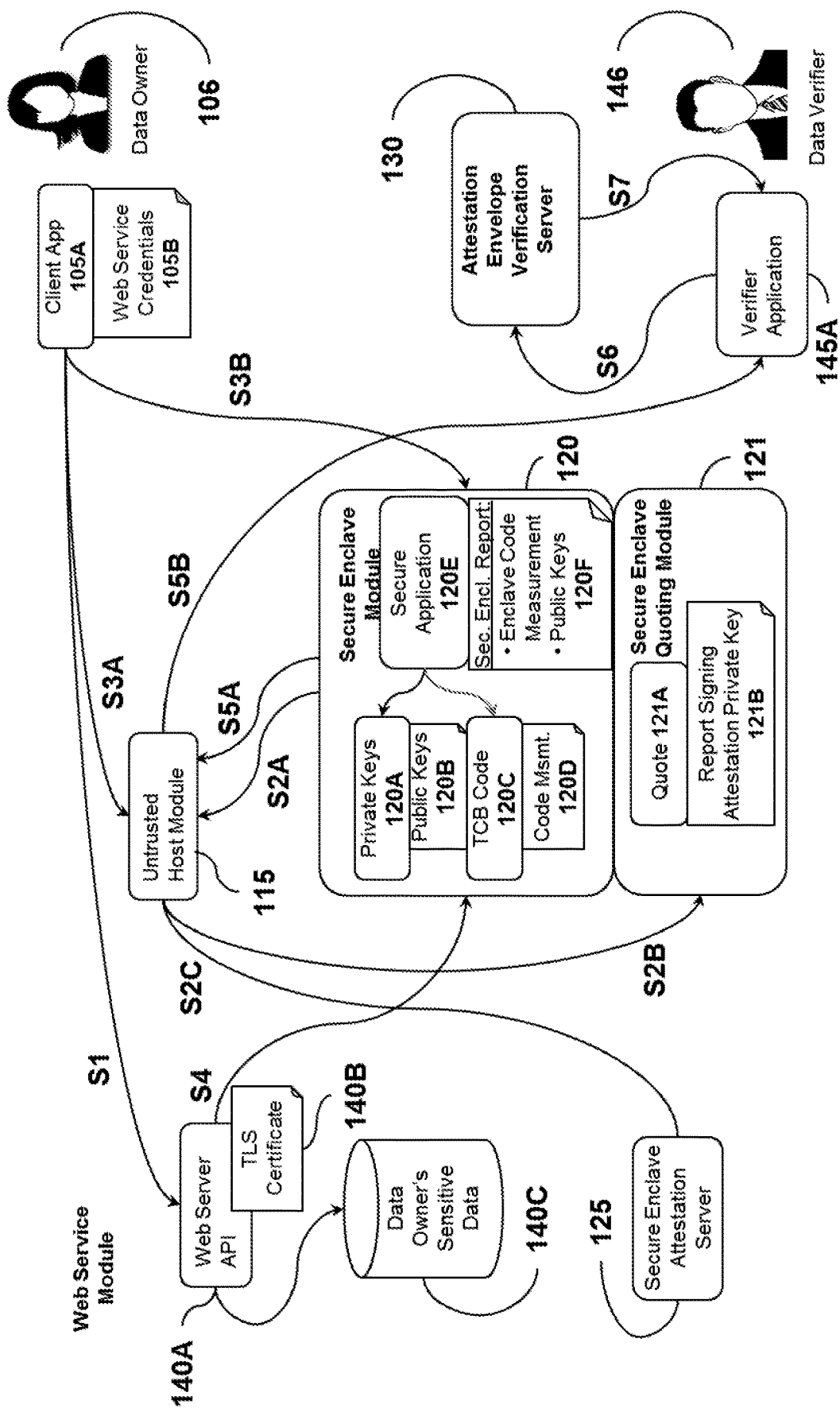

Reference is now made to FIG. 2, showing a detailed workflow diagrams of a system and method for providing verified privacy-preserving attestation of properties of private data stored on a web service, according to some embodiments of the invention. Numerical references in FIG. 2 refer to the same-referenced step or element in the workflow presented in FIG. 1, but in some cases with more detail. In some references in FIG. 2, a letter after a reference number (e.g., S2B, 120C) denotes a division, stored instructions, or stored data of the corresponding feature referenced in FIG. 1.

At step S1, a client application 105A (e.g., a web browser or mobile app) of a data owner device 105—under the agency of a data owner 106—stores data in a web server 140. When the data owner device 105 (or a verifier device 145, a device of an authorized party) initiates a request for a verified privacy-preserving data attestation from a data attestation server 110 (step not shown), an untrusted host module 115 of the data attestation server 110 receives the attestation request and passes it directly to a secure enclave module 120 of the data attestation server 110.

The secure enclave module 120, running a secure application defined by the TCB code 120E, receives the attestation request, and then at S2A responds to the untrusted host module 115 with a secure enclave report 120F comprising a set of public keys 120B (corresponding to a set of private keys 120A) and a unique measurement 120D (such as a cryptographic hash) of the TCB code 120C running in the secure enclave module 120. The untrusted host module 115 receives the secure enclave report 120F and dispatches it to a secure quoting enclave module 121 (typically provided by the same hardware manufacturer as the secure enclave module 120). At S2B, the secure quoting enclave module 121 verifies and signs the report 120F with a report signing attestation private key 121B to form a quote 121A. The untrusted host module 115 receives the quote 121A and dispatches it to a secure enclave attestation server 125. At S2C the secure enclave attestation server 125 attests that the secure enclave module 120 is secure by using the quote 121A to verify the platform the enclave is running on is secure and the quoting enclave is certified by the hardware manufacturer, and provides 470 a secure enclave attestation to the untrusted host 115.

At S3A, the client application 105A verifies the validity of the secure enclave attestation with the untrusted host module 115, thereby verifying that the secure enclave module 120 is in fact secure and assuring the data owner 106 that her data stored on the web server 140 will remain private. Upon positive verification, at S3B the client application 105A provides the secure enclave module 120 (via the untrusted host module 115) with web server access credentials 105B to the private data on the web server 140. The provided access credentials 105B are encrypted so that only the secure enclave module 120 can read them.

At S4, the secure enclave module 120, in communication with the web server API 140A through the untrusted host module 115, retrieves private data (and, optionally, non-private data) from the web server 140, and then the secure enclave module 120 runs a privacy-preserving computation of a requisite property of the private data.

At S5A, the secure enclave module 120 encapsulates the result of the property computation and other attestation data (further described herein) in an attestation envelope, signs the attestation envelope with one of the private keys 120A, and returns the attestation envelope and signature to the untrusted host module 115. At S5B, the untrusted host module 115 shares the attestation envelope and signature with a verifier application 145A (e.g., a browser or mobile app) of a verifier device 145, under the agency of a verifying entity 146.

At S6, the verifier application shares the attestation envelope with an attestation envelope verification server 130. At S7, the attestation envelope verification server 130 performs a series of checks (further described herein), including verifying TLS service certificates (preferably TLS, although other protocols are also possible), to ascertain that a secure enclave received the private data from the web service and performed the property calculation and returns the result of the checks to the verifier application 145A. The data verifier 146 is assured that the private data 140C of the data owner 106 meets the requisite property.

The invention combines aspects of the TLS protocol with a secure enclave attestation capability. A valid secure enclave attestation is an attestation that the secure enclave module 120 is genuine and secure and running the expected software (TCB), assuring that the private data is processed in secret and that the expected code is executed. During communication between the secure enclave module 120 and the web server (at step S4), a public key certificate and certificate chain (preferably X.509, although other formatting standards are possible) of the web server 140 is used in the TLS protocol to derive the keys used by the web server 140 to encrypt the response data of the web server 140. That is, in the basic TLS handshake, 1) the web server 140 provides an X.509; 2) the web server 140 and secure enclave 120 share secrets, such as random numbers, public keys, or premaster secrets that are encrypted using the public key of the web server 140. The X.509 and the secrets are combined by the parties to form a master secret used to authenticate and encrypt future messages. Performing the TLS handshake within the TCB code 120B of the secure enclave 120 and including the returned certificate chain in the signed attestation data envelope proves that the data came from the web server 140 bearing the X.509 server certificate and organization identity certificate. The web server 140 optionally provides a timestamp in its response (header) to the secure enclave module 120. The timestamp is used to attest the time of response.

The attestation envelope contains the secure enclave attestation and the web server certificate—proving that the data used in the computation originated from the web server 140—and the output of the privacy-preserving computation, a unique measurement (such as a cryptographic hash) of the computation source code in the TCB 120C, non-private data (if any), and the public keys of the secure enclave module 120, such that a verifier device 145 can verify the whole package and be assured of its integrity, thereby satisfying the verifier 146 that the data 140C of the data owner 106 stored in the web server 140 meets the requisite criteria.

Combining the certificates and keys generated during the TLS handshake with the secure enclave capability enables a proof that the data coming into the enclave was from a standard (unmodified) web server API provided by the web service provider.

Figure 3:
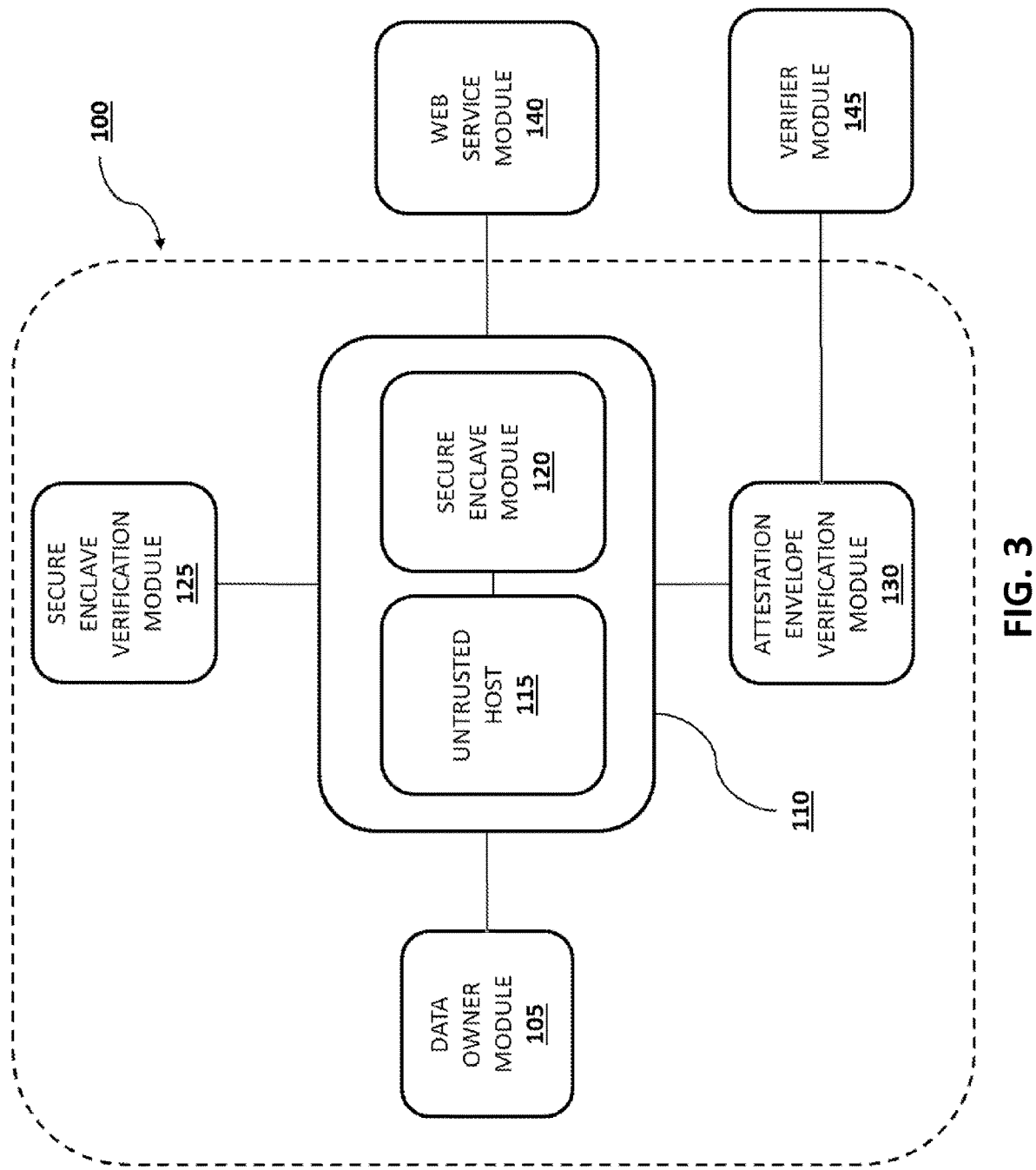
FIG. 3 shows a functional block diagram of a system for providing a verified privacy-preserving attestation of properties of private data stored on a web service, according to some embodiments of the invention.

Reference is now made to FIG. 3, showing a system 100 for providing a verified privacy-preserving attestation of properties of private data stored on a web service, according to some embodiments of the invention.

The system 100 comprises a data owner device 105, used to by a data owner to access private data stored and which stores or authorizes access to credentials to access private data of a data owner stored in a web server 140. The access credentials can include a username/password, biometric data such as finger or iris prints, an API token and secret, access delegation authority such as OAuth2, or any combination thereof.

The data owner device 105 may comprise a computing device (e.g., a desktop, notebook, tablet, smartphone, smart appliance, etc.) with access software, such as a web browser, to the web server 140. Data transfer between the data owner device 105 and the web server 140 is by a secure internet data transfer protocol, preferably HTTPS although other secure protocols may be used. The data owner device 105 may comprise a user interface for the data owner to authorize the verified privacy-preserving data attestation of their private data. The user interface may further provide access to the data owner for viewing their private data and non-private data stored in the web server 140 and for executing other privileges afforded the data owner by the web service (editing, transactions, etc.)

The system further comprises a data attestation server 110, which can be provided by a data attestation service entity. The data attestation server 110 includes an untrusted host module 115; and a secure enclave module 120 enabled to access the private data and compute its requested properties—in a privacy-preserving manner, as further described herein. In preferred embodiments, the untrusted host module 115 is provided to mediate secure communication between the secure enclave module 120 and modules external to the data attestation server 110, as it is best practice is to keep code in the secure enclave module 120 to a minimum, in order to facilitate attestation that the secure enclave 120 is secure. Therefore, some services described herein (e.g. the web server 140 exposing a communication port and handling non-encrypted aspects of web transport and communication protocol) can be run in the untrusted host module 115 alongside the secure enclave module 120, or, alternatively in the secure enclave module 120 itself. The untrusted host module 115 also preferably stores and presents a secure enclave attestation, further described herein, although in alternative embodiments the secure enclave attestation could reside elsewhere, including in the secure enclave itself.

In preferred embodiments, the TCB code of a secure enclave module 120 handles common privacy-preserving requests to different web services.

The system further comprises a secure enclave attestation module 125, which provides an attestation that the secure enclave module is secure, has a valid trusted computing base (TCB), and owns the private keys corresponding to a set of public keys.

An untrusted host module 115 typically configures, launches, and manages several secure enclave modules 120 in the data attestation server 110 for processing data attestation requests. The data owner device 105 sends a request for a verified privacy-preserving data attestation of one or more properties of the private data to the untrusted host module 115. The desired properties may be included with the request or may be stored in the untrusted host module 115 (e.g., to fulfill a standing order for periodic data attestations). Upon receiving the request, the untrusted host module 115 checks the public keys of the secure enclave module 120 that will service the request. If the public keys have not been previously verified as belonging to a secure enclave, the untrusted host module 115 then sends a request to the secure enclave attestation module 125 to attest to the secure enclave module 120. The secure enclave attestation module 125 replies with a secure enclave attestation packet for the secure enclave module 120, comprising a secure enclave attestation containing the public keys and a unique measurement of the TCB, a secure enclave attestation signature, and an X.509 secure enclave attestation signing certificate. In some embodiments, the untrusted host module 115 retains the secure enclave attestation and associated public keys for the lifetime of the secure enclave module 120. In some embodiments, the untrusted host module 115 will de-allocate, i.e. instruct the secure enclave module 120 to delete the public key, after the data attestation. The untrusted host module 115 may implement software updates to the secure enclave module 120. After a software update, the untrusted host module 115 requests new secure enclave attestation from the secure enclave attestation module 125.

Whether the secure enclave module 120 is newly configured, or the secure enclave module 120 is available at the time of the data attestation request, the untrusted host module 115 forwards the secure enclave attestation and at least one of the public encryption keys to the data owner device 105. The data owner device 105 may independently verify the secure enclave attestation, thereby determining that the enclave is genuine and secure, and the public keys can be used to encrypt private data.

The data owner device 105 generates a key pair consisting of a public and private key. A shared symmetric key is generated using a key agreement protocol such as Elliptic Curve Diffie-Hellman (ECDH). A corresponding symmetric key can be generated in the secure enclave module 120 using the public data owner device 105 key and the private encryption key of the secure enclave module 120.

Now that a private, trusted connection has been established between the data owner device 105 and the secure enclave module 120 via the symmetric key, the data owner device 105 sends the web service access credentials (e.g. username/password, biometrics, secure token) to the secure enclave module 120, encrypted using a secure symmetric key algorithm, such as the Advanced Encryption Standard (AES). The secure enclave module can either store the access credentials in temporary memory so that they are removed after the request is completed or encrypt them and save them to memory so that they can be retrieved for later requests allowing for computations on data properties that may change over time.

With the secure enclave module 120 holding the access credentials, the secure enclave module 120 requests a TLS-encrypted HTTPS connection to the web server 140, via the untrusted host module 115. The secure enclave module 120 performs a TLS handshake with the web server 140, thereby obtaining a TLS service certificate of the web server 140. The secure enclave module 120 provides the access credentials to the web server 140 and requests the data owner's private data. The secure enclave module 120 receives and decrypts the HTTPS response, from the web server 140, within which the private data is encapsulated. The secure enclave module 120 computes the requisite properti(es) of the private data. The secure enclave module 120 constructs an attestation envelope, comprising a. TLS server certificate received from the web server 140;
b. the computed requisite property of the private data 140C;
c. optionally, non-private data of the data owner, such as data proving the identity of the data owner 106, and a timestamp from the HTTPS response header; and
d. a signature of the above data generated with a private signing key corresponding to one of the public keys included in the report data, generated with a secure asymmetric key signing algorithm such as RSA.

Figure 4:
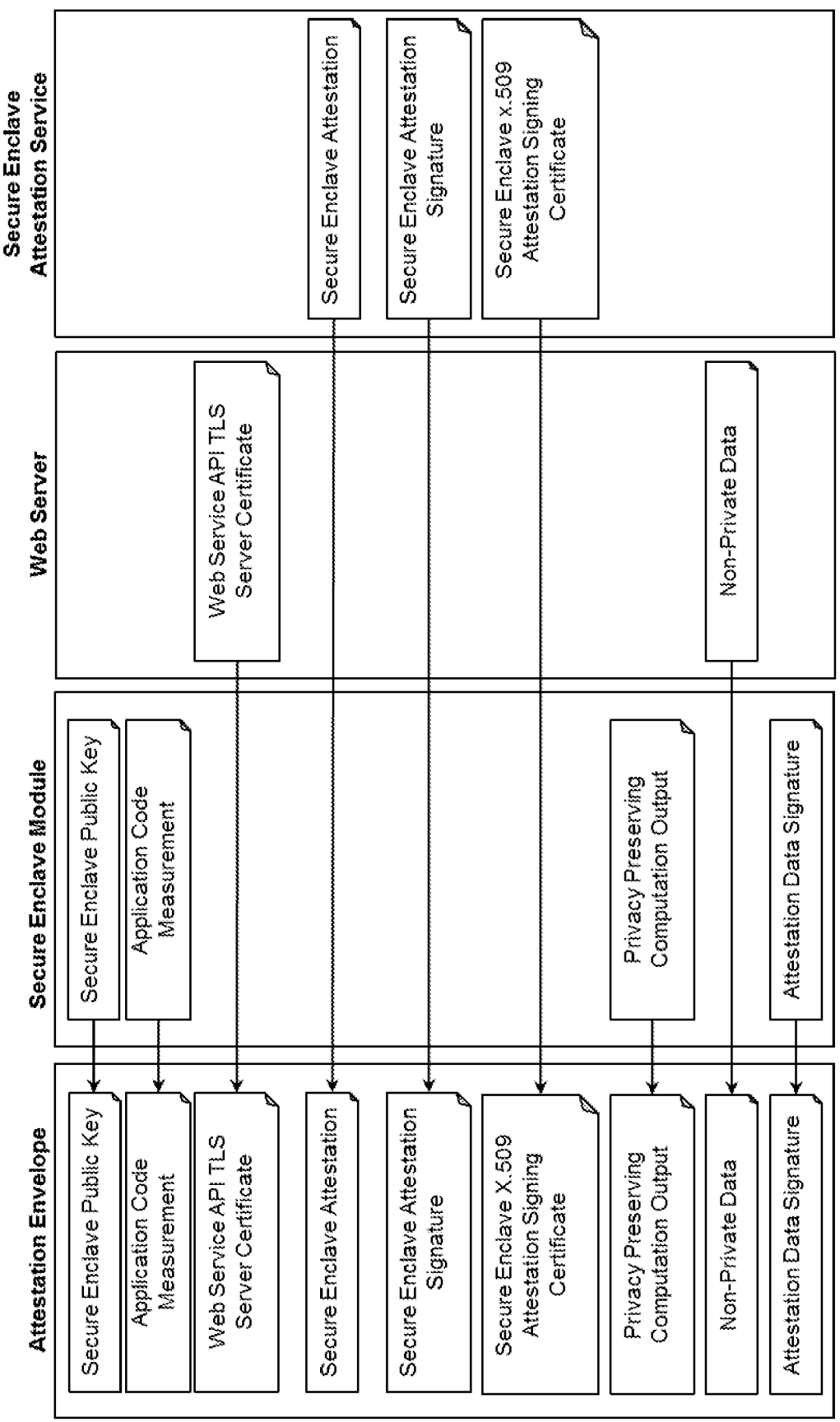
FIG. 4 schematically show the sources of elements in the attestation envelope, according to some embodiments of the invention.
Figure 5:
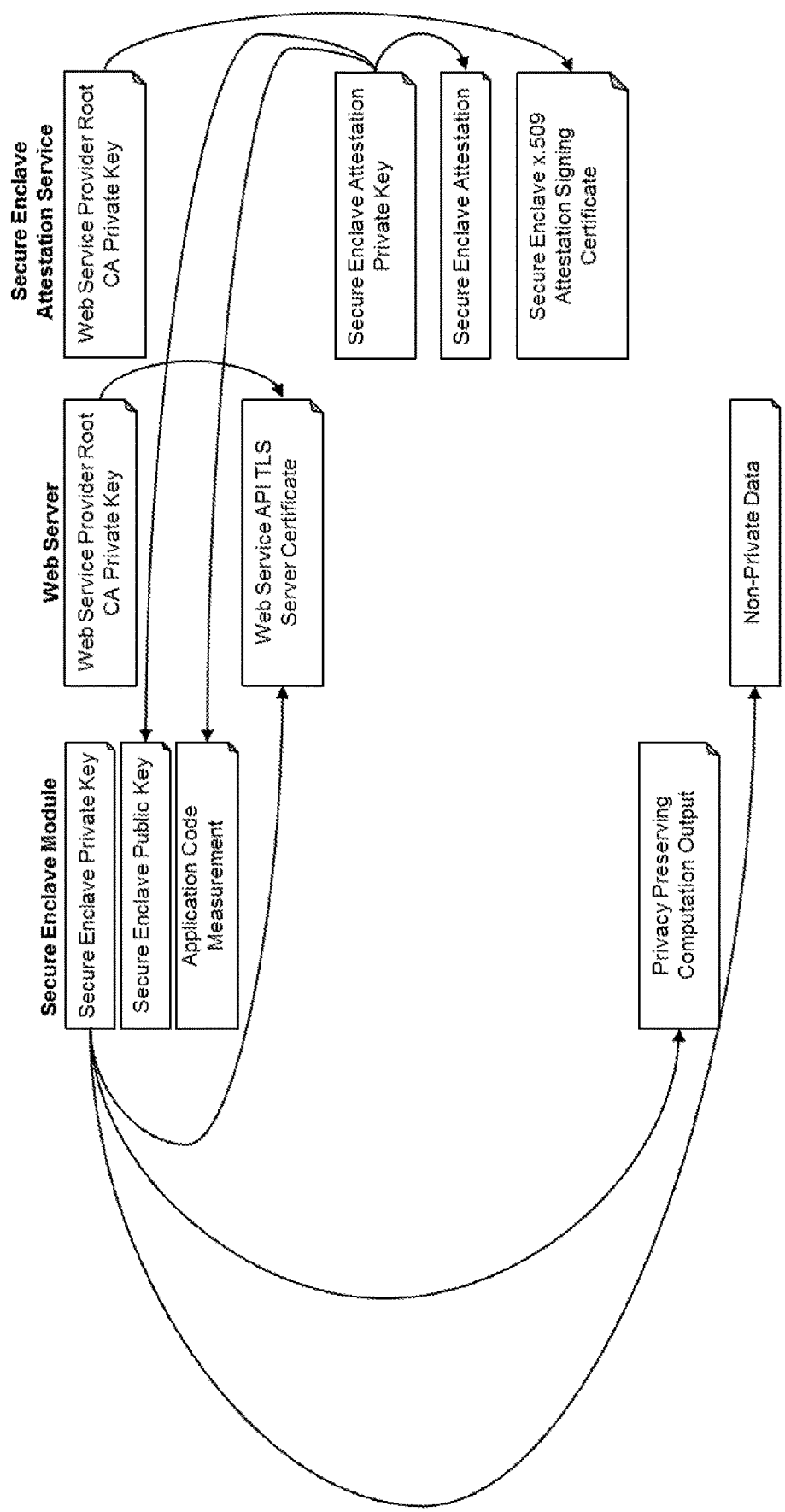
FIG. 5 shows a flow diagram of how each element of an attestation envelope is produced and signed, according to some embodiments of the invention.

The untrusted host module 115 receives the attestation envelope and adds the secure enclave attestation report, secure enclave attestation signature and secure enclave verifier certificate of the secure enclave module 120 to the attestation envelope. FIG. 4 schematically shows the sources of elements in the attestation envelope-certificates, signatures, and artifacts. FIG. 5 shows a flow diagram of how each element is produced and signed.

The system 100 further comprises an attestation envelope verification server 130. The untrusted host module 115 sends the attestation envelope to the attestation envelope verification server 130. The attestation envelope is also returned to the data owner device 105, and may be shared with an attestation envelope verification server 130 by other communication means such as email, file sharing, SMS, text messages. The attestation envelope to the attestation envelope attestation module 130 constructs an attestation envelope attestation report, based on its checking that a. the secure enclave attestation certificate, secure enclave attestation report, and secure enclave attestation signature are valid and provided by the expected enclave attestation party; and
b. the secure enclave attestation report matches the secure enclave public keys and contains the unique measurement of the secure enclave TCB code;
c. the TLS server certificate chain is valid;
d. the computed property is signed by a key that is paired with the secure enclave module 120; and
e. the untrusted host module 115 does not have any known security vulnerabilities and the secure enclave module 120 is configured correctly.

The checks by the attestation envelope verification server 130 may be conducted off-line, with no connection required to the other modules. The results of the checks by the attestation envelope verification server 130 are shared with a verifier 145 interested in knowing whether the data owner's private data meet the requisite properties.

Figure 6:
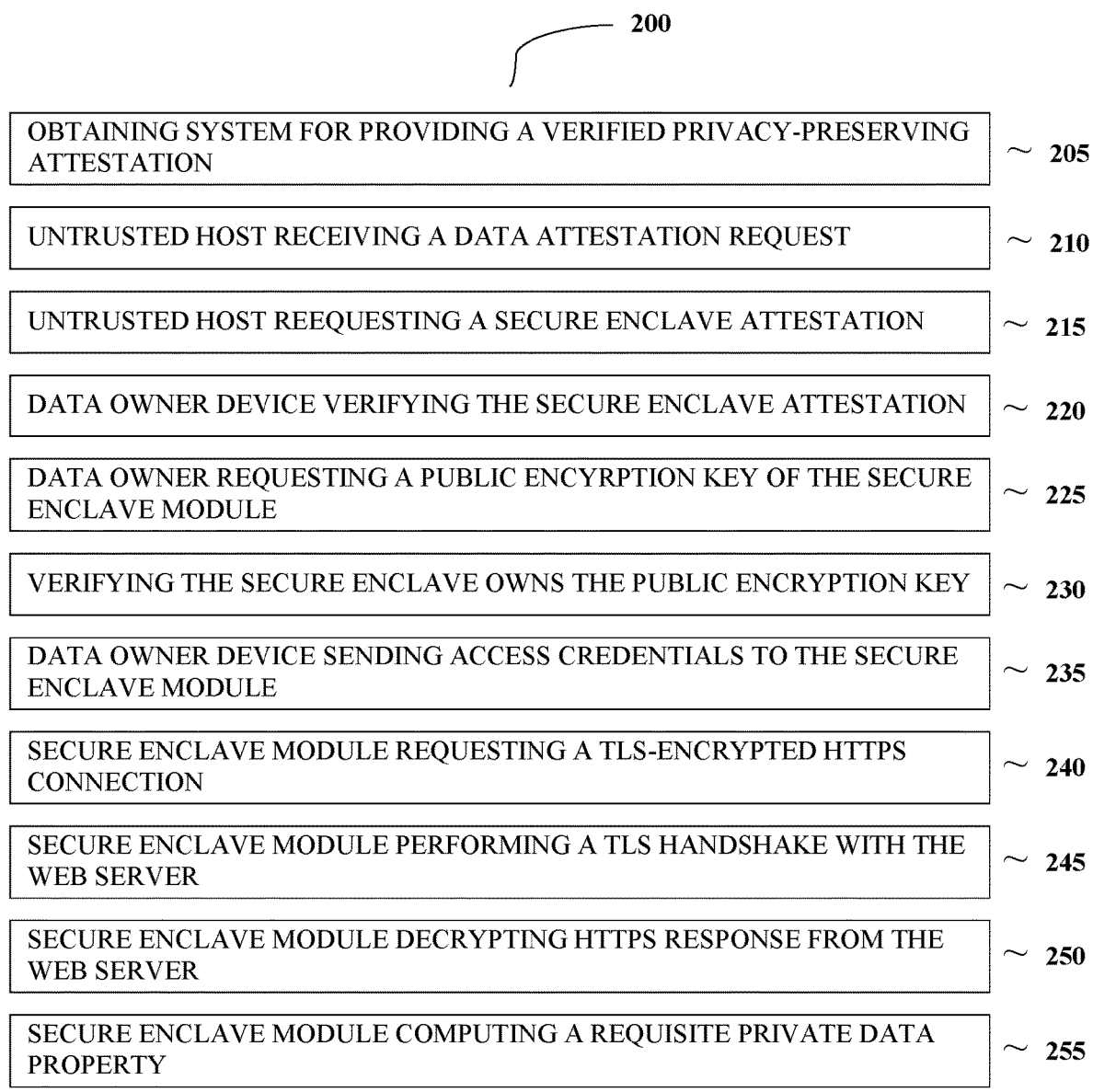
FIG. 6 shows a list of steps of a method for providing a verified privacy-preserving attestation of properties of private data stored on a web service, according to some embodiments of the invention.

Reference is now made to FIG. 6, showing a method 200 for providing a verified privacy-preserving attestation of properties of private data stored on a web service. The method 200 comprises steps of
a. the untrusted host module, configured to mediate communication to and from the secure enclave module, receiving a data attestation request 210;
b. the untrusted host module sending a secure enclave attestation packet for the secure enclave module-comprising a secure enclave attestation, a secure enclave attestation signature, and an X.509 secure enclave attestation signing certificate-generated by the secure enclave attestation module, to the data owner device 215; the secure enclave attestation attesting that the secure enclave module associated with the untrusted host module is secure and has a valid trusted computing base (TCB), the secure enclave attestation further comprising a unique measurement of the TCB code and the public keys belonging to the secure enclave;
c. the data owner device requesting a public key of the secure enclave module 225;
d. the data owner device verifying that the public key of the secure enclave module is identical to the public key provided in the secure enclave attestation 230;
e. the data owner device sending credentials for accessing private data stored on a web server to the secure enclave module, encrypted with a secure symmetric key algorithm 235;
f. the secure enclave module making a request for a TLS-encrypted HTTPS connection to the web server to retrieve the private data 240;
g. the secure enclave module performing a TLS handshake with the web server, thereby obtaining a TLS service certificate of the web server 245;
h. the secure enclave module decrypting an HTTPS response from the web server, the HTTPS response encapsulating the private data 250;
i. the secure enclave module computing one or more requisite properties of the private data 255;
j. the secure enclave module constructing an attestation envelope 260, comprising
  i. the web server TLS service certificate;
  ii. the computed requisite properties of the private data;
  iii. the attestation envelope signature of the secure enclave module for the above data.
k. the untrusted host module receiving the attestation envelope and inserting the secure enclave attestation, secure enclave attestation signature, and X.509 secure enclave attestation signing certificate 265;
l. the untrusted host module sending the attestation envelope to the attestation envelope verification server 270;
m. the attestation envelope verification server verifying the attestation envelope 275, comprising steps of
  i. checking that the secure enclave attestation verification report is valid and the report was signed by a private key corresponding to the public key certificate chain (a list of certificates where the parent certificate signs the child certificate) and ultimately signed by the root certificate authority of the hardware manufacturer; and
  ii. checking that the public keys reported in the secure enclave attestation packet matches the secure enclave public keys and contains the unique measurement of the TCB code;
  iii. checking that the web service TLS server certificate chain is valid;
  iv. checking that the computed property is signed by a key that is paired with the secure enclave module; and
  V. checking that the untrusted host module does not have any known security vulnerabilities and the secure enclave is configured correctly.

Figure 7:
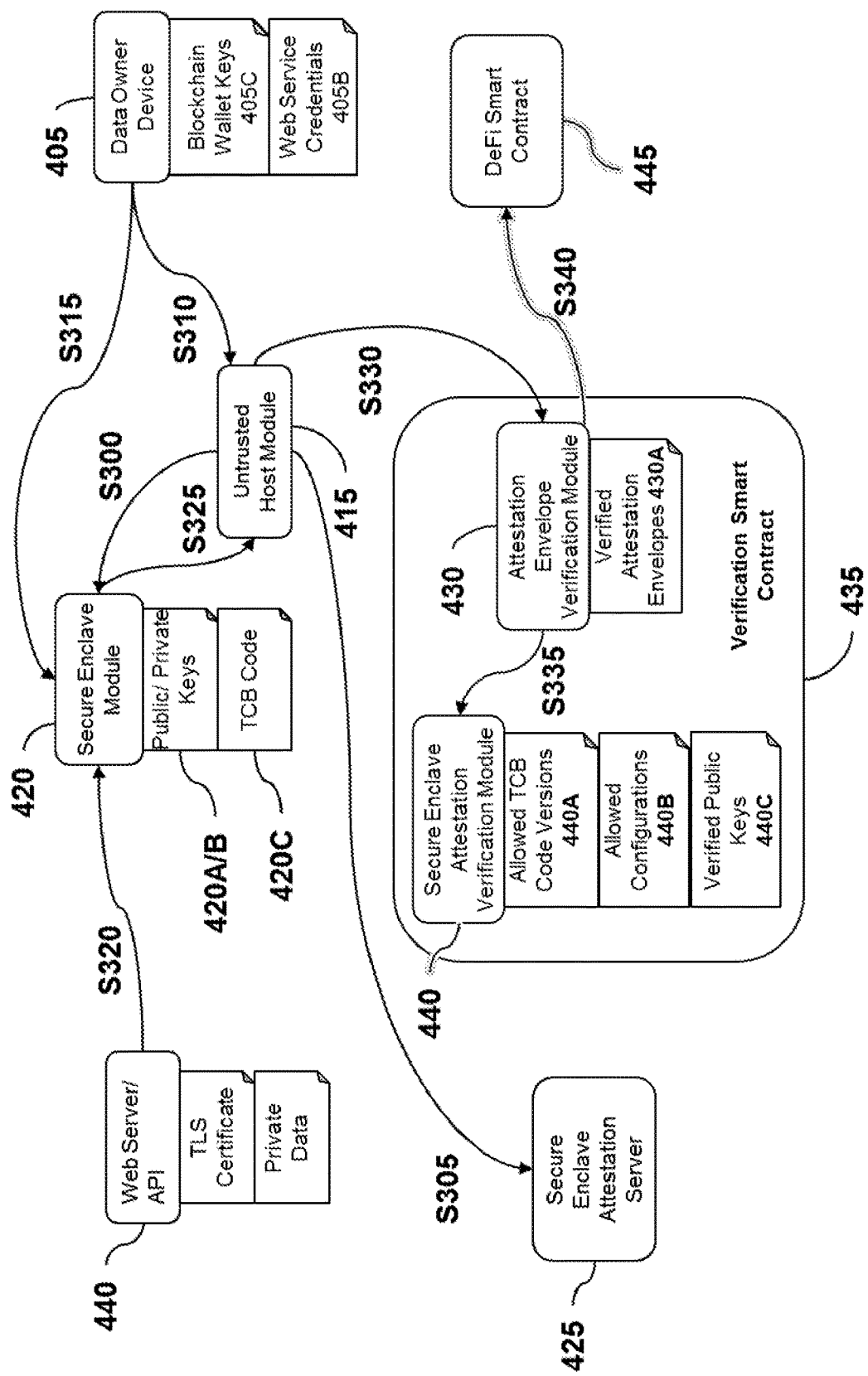
FIG. 7 shows a system for verifying and storing a verified privacy-preserving attestation of properties of private data on a blockchain and associating them with blockchain wallet addresses.

Reference is now made to FIG. 7, showing a flow diagram of a system and method for verifying and storing privacy-preserving attestation of properties of private data on a blockchain and associating them with blockchain wallet addresses.

At S300, an untrusted host module 415 configures a secure enclave module 420, and then generates a report about the configuration and TCB code being run in the secure enclave module 420. At S305, the untrusted host 415 verifies the report using a secure enclave attestation server 425. At S310, a data owner device 405 sends a request for a privacy-preserving attestation of private data to the untrusted host module 420 and receives a public encryption key for the enclave. At S315, the data owner module verifies the secure enclave module is secure, signs a message with their blockchain wallet private key, and sends the signature, signed message and web service credentials to the secure enclave 420, all encrypted with a secure symmetric key algorithm.

At S320, the secure enclave module uses the web service credentials to retrieve private data on behalf of the data owner, and then runs a privacy-preserving computation on that data. The secure enclave module produces a data attestation envelope comprising the result of the computation, optional public data, the blockchain wallet signature, and the signed message in an attestation data envelope and signs the data attestation envelope. At S325, the secure enclave module returns the attestation data envelope and signature to the untrusted host module. At S330, the untrusted host module (or in some embodiments, the data owner device) combines the attestation data envelope with the secure enclave verification and uploads them to an attestation envelope verification module of a smart contract verification server.

The attestation envelope verification module 430 checks a list 440C of verified secure enclave public keys stored therein by checking if the public keys used in the privacy-preserving attestation from the untrusted host have been verified and saved on the blockchain network of the verification smart contract 435 previously. If the public keys are not on the list 440C, at S335 the secure enclave attestation verification module 440 is summoned to check the secure enclave attestation, ensuring that it complies with a list 440A of allowed TCB code versions and a list 440B of allowed configurations. If the secure enclave verification module 440 validates the secure enclave attestation successfully, the public keys are saved to the blockchain network of the verification smart contract 435. The attestation data verification module 430 then verifies the attestation data envelope signature. If the signature complies, the blockchain wallet address is extracted from the signature originally sent to the secure enclave from the data owner. The verified attestation data envelope can then be shared, at S340, with other smart contracts 445 to trigger a number of decentralized finance actions associated with the data owner's wallet address.

The invention claimed is:

1. A system for providing a verified, privacy-preserving attestation of properties of private data stored on a web service, the system comprising:
　a data owner device;
　a data attestation server comprising:
　　an untrusted host module; and
　　a secure enclave module;
　a secure enclave attestation module; and
　an attestation envelope verification module;
wherein:
　the untrusted host module is configured to receive a data attestation request and to mediate communication with the secure enclave module;
　the secure enclave attestation module is configured to generate a secure enclave attestation packet comprising:
　　a secure enclave attestation;
　　a secure enclave attestation signature;
　　an X.509 secure enclave attestation signing certificate; and
　　a unique measurement of a trusted computing base (TCB) code and public keys of the secure enclave module;
　the untrusted host module is further configured to send the secure enclave attestation packet to the data owner device;
　the data owner device is configured to:
　　request a public key of the secure enclave module;
　　verify that the public key of the secure enclave module matches the public key in the secure enclave attestation; and
　　send encrypted credentials, using a symmetric key, for accessing private data stored on a web server to the secure enclave module;
　the secure enclave module is configured to:
　　initiate a Transport Layer Security (TLS)-encrypted Hypertext Transfer Protocol Secure (HTTPS) connection with the web server;
　　perform a TLS handshake with the web server and obtain a TLS service certificate of the web server;
　　decrypt an HTTPS response from the web server, the response comprising the private data;
　　compute one or more requisite properties of the private data; and
　　construct an attestation envelope comprising:
　　　the web server TLS service certificate;
　　　the computed properties of the private data; and
　　　an attestation envelope signature generated by the secure enclave module;
　the untrusted host module is further configured to:
　　receive the attestation envelope;
　　insert the secure enclave attestation, secure enclave attestation signature, and X.509 secure enclave attestation signing certificate into the attestation envelope; and
　　transmit the attestation envelope to an attestation envelope verification server;
　the attestation envelope verification server is configured to:
　　verify the digital signature of the secure enclave attestation, including validation of a certificate chain and a root certificate issued by a hardware manufacturer;
　　confirm that the public keys in the attestation packet match the secure enclave public keys and include the unique measurement of the TCB code;
　　validate the TLS server certificate chain of the web server;
　　verify that the computed property is signed by a key associated with the secure enclave module; and
　　confirm that the untrusted host module has no known security vulnerabilities and that the secure enclave is correctly configured;
　wherein the system is further configured to execute a smart contract transaction in response to a successful verification of the attestation envelope.

2. The system of claim 1, wherein, in response to a determination that the public keys of the secure enclave module have not been verified by the secure enclave attestation module, the system is further configured such that:
　the secure enclave module is configured to generate a secure enclave report comprising a measurement of the TCB code and public keys of the secure enclave module;
　the untrusted host module is configured to receive the secure enclave report and transmit the secure enclave report in a remote attestation request to the secure enclave attestation module; and
　the secure enclave attestation module is configured to generate a secure enclave attestation, a secure enclave verification signature, and an X.509 secure enclave verification certificate, and to transmit the secure enclave attestation, the secure enclave verification signature, and the X.509 secure enclave verification certificate to the untrusted host module.

3. The system of claim 1, further comprising a quoting module configured to digitally sign the secure enclave report.

4. The system of claim 1, wherein the public keys of the secure enclave module are randomly generated, derived from the unique measurement of the TCB code, or a combination thereof.

5. The system of claim 1, wherein the data owner device is further configured to verify the secure enclave verification credentials and an encryption public key of the secure enclave module before encrypting private data using a symmetric key.

6. The system of claim 1, wherein the secure enclave module is further configured to encrypt and store the access credentials for later subsequent use.

7. The system of claim 1, wherein the secure enclave module is further configured to include non-private data in the attestation envelope.

8. The system of claim 7, wherein the non-private data comprises one or more of: data identifying the data owner and a data response timestamp.

9. The system of claim 1, further comprising a verifier device configured to access an output of the attestation envelope verification server.

10. A system for verifying and storing a privacy-preserving attestation of properties of private data stored on a web server on a blockchain and associating the attestation with a blockchain wallet address, comprising:
    a data owner device;
    a web server;
    a data attestation server comprising:
        an untrusted host module; and
        a secure enclave module;
    a secure enclave attestation server;
    an attestation envelope verification module and a secure enclave attestation verification module implemented as part of a verification smart contract; and
    a blockchain network comprising a decentralized finance smart contract;
wherein:
    the untrusted host module is configured to configure the secure enclave module and generate a report about the configuration and a trusted computing base (TCB) code executing in the secure enclave module;
    the untrusted host module is further configured to verify the report with the secure enclave attestation server;
    the data owner device is configured to send a request for a privacy-preserving attestation of private data to the untrusted host module and to receive a public encryption key for the secure enclave module in response;
    the data owner device is further configured to sign a message using a blockchain wallet private key associated with the data owner and to transmit the signed message, a blockchain wallet signature, and credentials for accessing the web server to the secure enclave module;
    the secure enclave module is configured to:
        retrieve the private data from the web server using the provided credentials;
        perform privacy-preserving computations on the private data to determine one or more properties of the private data;
        construct an attestation envelope comprising the signed message, the blockchain wallet signature, and the results of the computation; and
        digitally sign the attestation envelope and transmit the signed envelope to the untrusted host module;
    the untrusted host module or the data owner device is configured to upload the attestation envelope and a secure enclave attestation to the attestation envelope verification module of the verification smart contract;
    the secure enclave attestation verification module is configured to:
        verify that the public keys used in the secure enclave attestation are associated with a valid secure enclave;
        validate the digital signature on the attestation envelope; and
        extract the blockchain wallet address from the blockchain wallet signature and the signed message;
    the decentralized finance smart contract is configured to record the verified attestation on the blockchain and to associate it with the extracted blockchain wallet address;
    wherein the system is further configured to execute a transfer of funds according to the smart contract in response to successful verification of the attestation envelope.

11. The system of claim 10, wherein the blockchain comprises a liquidity pool, and the release of funds from the liquidity pool is dependent on successful verification of the attestation envelope, the attestation envelope representing financial risk credentials of an individual, an organization, or a document, including an invoice, or a privacy-preserving proof of one or more of Know Your Customer (KYC), Know Your Business (KYB), Know Your Transaction (KYT), or Anti-Money Laundering (AML) compliance credentials of a decentralized finance investor.

12. A method for providing a verified, privacy-preserving attestation of properties of private data stored on a web service, the method comprising:
    obtaining a system configured to perform the attestation process;
    receiving, by an untrusted host module configured to mediate communication with a secure enclave module, a data attestation request;
    sending, by the untrusted host module, a secure enclave attestation packet to a data owner device, the secure enclave attestation packet generated by a secure enclave attestation module and comprising:
    a secure enclave attestation;
    a secure enclave attestation signature;
    an X.509 secure enclave attestation signing certificate;
    a unique measurement of a trusted computing base (TCB) code and public keys of the secure enclave module;
    requesting, by the data owner device, a public key of the secure enclave module;
    verifying, by the data owner device, that the public key of the secure enclave module matches the public key in the secure enclave attestation;
    sending, by the data owner device, encrypted credentials for accessing private data stored on a web server to the secure enclave module, using a secure symmetric key;
    requesting, by the secure enclave module, a Trusted Layer Security (TLS)-encrypted Hypertext Transfer Protocol Secure (HTTPS) connection to the web server;
    performing, by the secure enclave module, a TLS handshake with the web server and obtaining a TLS service certificate of the web server;
    decrypting, by the secure enclave module, an HTTPS response from the web server, the response comprising the private data;
    computing, by the secure enclave module, one or more requisite properties of the private data;
    constructing, by the secure enclave module, an attestation envelope comprising:
        the TLS service certificate of the web server;
        the computed properties of the private data; and
        an attestation envelope signature generated by the secure enclave module;
    receiving, by the untrusted host module, the attestation envelope and inserting into the envelope the secure enclave attestation, the secure enclave attestation signature, and the X.509 secure enclave attestation signing certificate;
    transmitting, by the untrusted host module, the attestation envelope to an attestation envelope verification server;
    verifying, by the attestation envelope verification server, the attestation envelope by:
        validating that the secure enclave attestation report is signed by a private key corresponding to a certificate chain rooted in a certificate authority of a hardware manufacturer;
        confirming that the public keys reported in the secure enclave attestation match the secure enclave module public keys and contain the unique measurement of the TCB code;
        verifying that a certificate chain of the TLS server of the web service is valid;

verifying that the computed properties of the private data are signed by a key associated with the secure enclave module; and confirming that the untrusted host module has no known vulnerabilities and that the secure enclave is configured correctly;

wherein the method is further configured to execute a smart contract transaction in response to successful verification of the attestation envelope.

13. The method of claim 12, further comprising, in response to a determination that public keys of the secure enclave module have not been verified by a secure enclave attestation server:

generating, by the secure enclave module, a secure enclave report comprising:
  a measurement of the TCB code; and
  public keys of the secure enclave module;

receiving, by the untrusted host module, the secure enclave report and transmitting the secure enclave report along with a remote attestation request to the secure enclave attestation module; and generating, by the secure enclave attestation module, a secure enclave attestation, a secure enclave attestation signature, and a secure enclave attestation signing certificate, and transmitting the secure enclave attestation, secure enclave attestation signature, and secure enclave attestation signing certificate to the untrusted host module.

14. The method of claim 13, further comprising signing, by a quoting module, the secure enclave report.

15. The method of claim 12, wherein the public keys of the secure enclave module are randomly generated, derived from the unique measurement of the TCB code, or a combination thereof.

16. The method of claim 12, further comprising verifying, by the data owner device, secure enclave attestation credentials and an encryption public key before encrypting private data using a symmetric key.

17. The method of claim 12, further comprising encrypting and storing, by the secure enclave module, the access credentials for subsequent use.

18. The method of claim 12, further comprising including, by the secure enclave module, non-private data in the attestation envelope.

19. The method of claim 18, wherein the non-private data comprises one or more of data identifying the data owner and a data response timestamp.

20. The method of claim 12, further comprising providing a verifier device with access to the output of the attestation envelope verification server.

21. A method for verifying and storing a privacy-preserving attestation of properties of private data stored on a web server on a blockchain and associating the attestation with a blockchain wallet address, the method comprising:

receiving, at an untrusted host module, configuration instructions to initialize a secure enclave module and generating a secure enclave report comprising configuration data and a trusted computing base (TCB) code of the secure enclave module;

verifying, by the untrusted host module, the secure enclave report with a secure enclave attestation server;

receiving, at the untrusted host module, a request from a data owner device for a privacy-preserving attestation of private data and returning a public encryption key of the secure enclave module to the data owner device;

signing, by the data owner device, a message with a blockchain wallet private key and sending the signed message and a blockchain wallet signature along with web service credentials to the secure enclave module;

retrieving, by the secure enclave module, private data from the web server and performing privacy-preserving computations on the private data to generate a data attestation envelope, the data attestation envelope comprising the signed message, the blockchain wallet signature, and a result of the computation, and signing the data attestation envelope;

returning, by the secure enclave module, the signed data attestation envelope to the untrusted host module;

uploading, by the untrusted host module or the data owner device, the signed data attestation envelope and secure enclave verification data to an attestation envelope verification module of a smart contract verification server;

verifying, by a secure enclave attestation verification module, that public keys in the data attestation envelope belong to a secure enclave, that the signature of the data attestation envelope is valid, and that the original blockchain wallet address can be extracted from the blockchain wallet signature and signed message;

triggering, by a blockchain smart contract, upon successful verification of the attestation envelope, execution of a transaction by storing the result on a blockchain of a decentralized finance smart contract;

wherein the method further comprises executing a transfer of funds according to the smart contract.

22. The method of claim 21, further comprising configuring the blockchain to represent a liquidity pool, wherein releasing funds from the liquidity pool is conditioned on verification of the attestation envelope, the attestation envelope comprising at least one of:

financial risk credentials of an individual, organization, or document including an invoice; or a privacy-preserving proof of Know Your Customer (KYC), Know Your Business (KYB), Know Your Transaction (KYT), or Anti-Money Laundering (AML) credentials of a decentralized finance investor.

* * * * *